(12) United States Patent
Orr

(10) Patent No.: US 12,179,426 B2
(45) Date of Patent: Dec. 31, 2024

(54) MATERIAL DISPENSING PUMP FOR ADDITIVE FABRICATION

(71) Applicant: Formlabs, Inc., Somerville, MA (US)

(72) Inventor: Thomas Orr, Cambridge, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

(21) Appl. No.: 17/580,969

(22) Filed: Jan. 21, 2022

(65) Prior Publication Data
US 2022/0234291 A1 Jul. 28, 2022

Related U.S. Application Data

(60) Provisional application No. 63/140,408, filed on Jan. 22, 2021.

(51) Int. Cl.
B29C 64/209 (2017.01)
B33Y 30/00 (2015.01)

(52) U.S. Cl.
CPC ............ *B29C 64/209* (2017.08); *B33Y 30/00* (2014.12)

(58) Field of Classification Search
None
See application file for complete search history.

(56) References Cited

U.S. PATENT DOCUMENTS

| | | | | |
|---|---|---|---|---|
| 10,254,499 | B1 * | 4/2019 | Cohen | .................... H01R 4/024 |
| 11,660,811 | B1 * | 5/2023 | Contractor | ............ B29C 64/343 |
| | | | | 425/375 |
| 2002/0025260 | A1 * | 2/2002 | Maruyama | ............ F04B 17/003 |
| | | | | 417/322 |
| 2014/0252041 | A1 * | 9/2014 | Ikushima | ............ B05C 11/1034 |
| | | | | 222/309 |

(Continued)

FOREIGN PATENT DOCUMENTS

| | | | | |
|---|---|---|---|---|
| CN | 106264796 A | * | 1/2017 | ............... A61F 2/28 |
| DE | 102018009512 B3 | * | 11/2019 | ....... B05C 17/00569 |

(Continued)

OTHER PUBLICATIONS

Yuyama, S, et al. "Machine Translation of WO 2015129733 A1: 3D printer". EPO. Espacenet. 2023 (Year: 2023).*

(Continued)

*Primary Examiner* — Farah Taufiq
*Assistant Examiner* — Jonathan B Woo
(74) *Attorney, Agent, or Firm* — Michael J. Attisha; Greenberg Traurig, LLP

(57) ABSTRACT

Techniques to allow an additive fabrication device to dynamically adjust the size of a post metering volume for adjusting pressure of source material in the volume. These techniques may allow for greater control of material extrusion through an orifice and thereby mitigate or avoid issues of lag time between starting and/or stopping extrusion and/or in which there is unwanted emission of source material through the orifice. In some cases, techniques for adjusting the size of the post metering volume may include operating an actuator arranged in a channel that is coupled to the post metering volume. In some cases, techniques for adjusting the size of the post metering volume may include having a stator that is at least partially arranged within a chamber that defines the post metering volume and is free to move within the chamber.

13 Claims, 7 Drawing Sheets

(56) References Cited

U.S. PATENT DOCUMENTS

2017/0210069 A1* 7/2017 Stubenruss ........... B29C 64/118
2019/0216591 A1* 7/2019 Li ......................... A61L 27/507
2020/0147875 A1* 5/2020 Asgeirsson ........... B29C 64/255
2020/0406531 A1* 12/2020 Hashimoto ........... B29C 64/245
2021/0053285 A1* 2/2021 Anegawa ............... B33Y 50/02

FOREIGN PATENT DOCUMENTS

| WO | WO-2014153535 A2 * | 9/2014 | ........... B29C 64/209 |
| WO | WO-2015129733 A1 * | 9/2015 | ........... B29C 61/106 |
| WO | WO-2018017295 A1 * | 1/2018 | ........... B21C 23/005 |
| WO | WO-2020236167 A1 * | 11/2020 | ............. B22F 10/10 |
| WO | WO-2020260053 A1 * | 12/2020 | ............. A23P 30/20 |

OTHER PUBLICATIONS

Moser, P. "English Machine Translation of DE-102018009512-B3: Metering." 2023. Espacenet. EPO. (Year: 2023).*

Li, F, et al. "Machine Translation of CN106264796A: 3D printing system based on multi-axis linkage control and machine vision measurement". EPO. Espacenet. 2023 (Year: 2023).*

* cited by examiner

MATERIAL DISPENSING PUMP FOR ADDITIVE FABRICATION

CROSS REFERENCE TO RELATED APPLICATIONS

The present application claims the benefit under 35 U.S.C. § 119(e) of U.S. Provisional Patent Application No. 63/140,408, titled "Material Dispensing Pump for Additive Fabrication," filed Jan. 22, 2021, which is hereby incorporated by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically, each layer is formed such that it adheres to either a previously formed layer or a substrate upon which the object is built.

SUMMARY

According to some aspects, an additive fabrication device is provided configured to form parts from a source material on a build platform. The additive fabrication device comprises a build platform, a motion system configured to move along at least one axis, and a material deposition mechanism coupled to the motion system and configured to deposit a source material onto the build platform. The material deposition mechanism comprises a chamber comprising an inlet and an orifice, a first actuator configured to drive the source material through the inlet into the chamber and out through the orifice, a channel coupled to the chamber and comprising a moveable element, and a second actuator coupled to the moveable element and configured to displace the moveable element along the channel.

According to some aspects, additive fabrication device is provided configured to form parts from a source material on a build platform. The additive fabrication device comprises a build platform, a motion system configured to move along at least one axis, and a material deposition mechanism coupled to the motion system and configured to deposit a source material onto the build platform. The material deposition mechanism comprises a chamber comprising an orifice, a stator arranged at least partially within the chamber and free to move between first and second positions within the chamber, and a pump actuator arranged at least partially within the stator and configured to drive the source material through the chamber and out of the orifice.

According to some aspects, a method is provided of operating an additive fabrication device to fabricate parts from a source material, the additive fabrication device comprising a material deposition mechanism. The method comprises operating a first actuator to drive the source material through an inlet of a chamber of the material deposition mechanism and out through an orifice of the chamber, depositing the source material output from the orifice onto a build platform, and operating a second actuator to displace a moveable element along a channel coupled to the chamber, thereby decreasing pressure of source material within the chamber.

According to some aspects, a method is provided of operating an additive fabrication device to fabricate parts from a source material, the additive fabrication device comprising a material deposition mechanism. The method comprises operating a pump actuator in a first direction to drive a source material through a chamber of the material deposition mechanism and out through an orifice of the chamber, depositing the source material output from the orifice onto a build platform, and operating the pump actuator in a second direction, different from the first direction, thereby causing a stator arranged at least partially within the chamber to move within the chamber and thereby decrease pressure of source material within the chamber.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
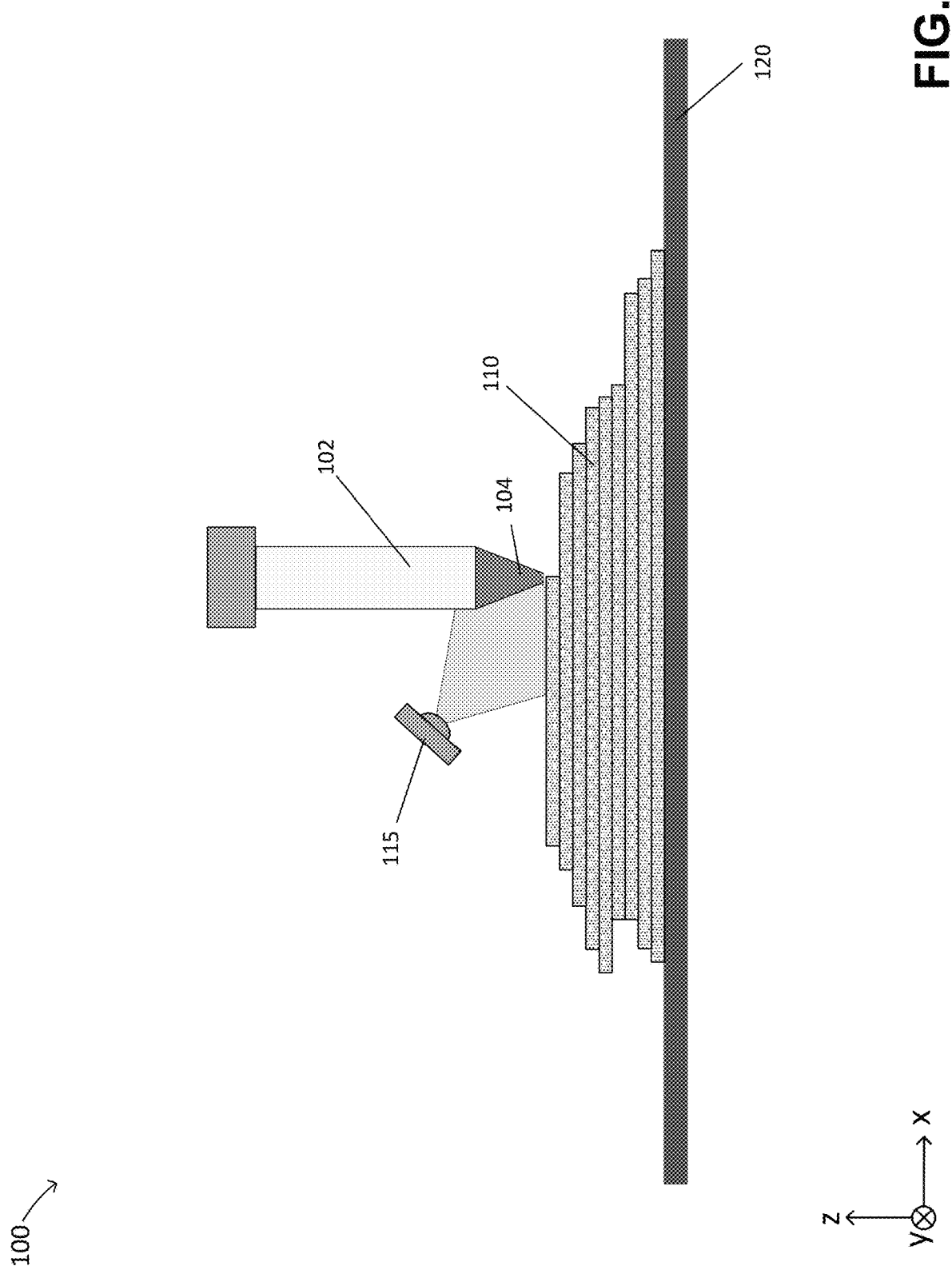
FIG. 1 is a schematic of an illustrative additive fabrication device configured to fabricate parts through photopolymer extrusion, according to some embodiments.

In additive fabrication, a desired part may be fabricated by forming successive layers of a source material on top of one another. For example, in stereolithography (SLA), a part may be fabricated by successively forming thin layers of a polymer by photocuring portions of a photopolymer liquid, typically first onto a substrate and then one on top of another.

In another example, in fused filament fabrication (FFF) a part may be fabricated by extruding a source material (e.g., molten or otherwise softened plastic) into thin layers, one on top of another. In yet another example, in photopolymer extrusion (PE), a part may be fabricated through extrusion and curing of a photopolymer into layers. In photopolymer extrusion, a pump extrudes the photopolymer out of an orifice onto a substrate or onto a previously formed layer where it is then cured, for example, by applying ultraviolet light onto the photopolymer.

Some additive fabrication techniques may be limited in how quickly an extruder can start and stop dispensing material out of an orifice. For instance, in FFF a mechanical extruder may push a thermoplastic filament into a hot end containing an orifice. When the extruder stops extruding the filament the orifice may not immediately stop dispensing material, however, because the hot end may contain molten plastic that is under pressure, causing unwanted emission of the molten plastic out of the orifice. Similarly, in PE a pump may push material toward an orifice but when the pump is deactivated material may still exit the orifice due to pressure built up between the pump and the orifice.

In general, extrusion-based additive fabrication devices include some interior volume between an orifice and some kind of actuator that drives material through the orifice. Since the actuator cannot generally be placed directly at the orifice, it may be impractical to avoid the presence of at least some small interior volume between the output of the actuator and the orifice. This volume may be referred to herein as the "post metering volume." When the actuator is deactivated (or otherwise operated to reduce or stop material flow through the orifice), there may be unwanted emission of any source material within the post metering volume out of the orifice, which may result in source material being deposited in unwanted areas.

Deposition of unwanted material may be especially pronounced in PE fabrication which often has a larger post metering volume than other extrusion-based additive fabrication technologies to maintain a reasonable flow of liquid through the nozzle. Furthermore, the source material (e.g., liquid) used in PE may have a high compressibility. To start the flow of liquid, the source material within the post-metering volume is pressurized to cause liquid to dispense out of the orifice. This results in a time lag between when the pump starts pumping and when the source material starts dispensing. Similarly, when the pump stops pumping, the source material is still pressurized and may continue to ooze out of the orifice, causing a time lag between when the pump stops pumping and when source material stops dispensing. In at least some cases, these start and stop lag times may grow linearly as the post metering volume increases.

One approach used to try to reduce lag and stop the flow of material through the orifice may include retraction, in which the actuator is rapidly reversed to depressurize the post metering volume. In FFF, for instance, the extruder mechanism can be run in reverse to pull the filament out of the post metering volume, whereas in PE the pump may be operated in reverse to suck source material out of the post metering volume. Retraction, however, may only work well with materials with low compressibility or within systems that have a small post metering volume.

The inventors have recognized and appreciated techniques for dynamically adjusting the size of the post metering volume to thereby reduce the pressure therein. These techniques may allow for greater control of material extrusion through an orifice and thereby mitigate or avoid the above-described issues in which there is a time lag between starting and/or stopping extrusion and/or in which there is unwanted emission of source material through the orifice. For instance, the techniques described herein may allow the post metering volume to be decreased when extrusion starts. Decreasing the post metering volume when the pump starts will increase the pressure of source material within the volume to more quickly start dispensing the material through the orifice. Conversely, when extrusion stops the post metering volume may be increased to lower the pressure of source material within the volume to more quickly stop the flow of material out of the orifice. As such, by adjusting the size of the post metering volume when extrusion starts and stops, the dispensing lag times may be minimized or eliminated.

According to some embodiments, adjusting the size of the post metering volume may comprise operating an actuator arranged in a channel that is coupled to the post metering volume. Operating the actuator along the channel may displace a moveable element within the channel such that the total post metering volume, which includes part of the channel, is effectively increased or decreased. For instance, a first actuator may drive material into an inlet of a chamber and out through an orifice of the chamber. When the first actuator begins operation, the actuator within the channel may displace the moveable element to decrease the effective volume of the chamber and to thereby increase the pressure of source material within it. When the first actuator stops operation, the actuator in the channel may displace the moveable element to increase the effective volume of the chamber and to thereby decrease the pressure of source material within it.

According to some embodiments, adjusting the size of the post metering volume is accomplished by an actuator having a stator that is at least partially arranged within a chamber that defines the post metering volume. The stator may be free to move within the chamber such that its motion increases and decreases the effective size of the post metering volume. Operation of the actuator may cause the stator to move as a result of frictional forces between the actuator and the stator. For instance, in some embodiments a stator may be part of a progressive cavity pump. When a pump actuator of the progressive cavity pump is operated in one direction, this may cause the stator to moves in the same direction from a first position to a second position, and when the pump is operated in another direction, this may cause the stator to move back from the second position to the first position. In some embodiments, the stator may act as a rotating cam that cams downwards when the pump operates in one direction and cams upwards when the pump operates in the opposing direction.

In some embodiments, the pump actuator may engage the stator and cause the stator to move within the chamber due to higher frictional forces between the pump actuator and the stator compared with frictional forces between the stator and the chamber walls. In some embodiments, the stator's range of motion may be limited by a mechanical stop in the chamber, thereby preventing further movement of the stator while the pump continues operation in the same direction. When the pump reverses direction, the high friction between the stator and the pump may cause the stator to move with the pump until it reaches another mechanical stop in the chamber. Accordingly, the stator may move by only a specified constrained distance between first and second positions while the pump may continue moving in either directions. As noted above, the movement of the stator increases or decreases the post metering volume to rapidly start or stop dispensing liquid through the orifice due to the post metering volume being defined at least in part by the stator.

Although example implementations may be described herein with reference to various additive fabrication technologies, it should be appreciated that embodiments are not limited to any particular additive fabrication technology. Techniques described herein may be applied with respect to any suitable additive fabrication technology.

FIG. 1 shows a schematic of an illustrative photopolymer extrusion device, according to some embodiments. In the example of FIG. 1, additive fabrication device 100 is configured to form layers of a solid material 110 by extruding a liquid photopolymer through a nozzle, which is then cured by a suitable source of actinic radiation. This technique of forming a part through extrusion and curing of a photopolymer may be referred to as "photopolymer extrusion," or "PE."

In the example of FIG. 1, an extruder 102 is configured to be operated to move within three-dimensional space relative to a build platform 120. In some embodiments, the extruder and/or the build platform may be coupled to a suitable multi-axis motion system that may be operated to produce relative motion, thereby allowing the extruder to be positioned at a desired position relative to the build platform. For instance, the extruder 102 may be coupled to two single-axis motion systems (e.g., systems configured to move the extruder along the x-axis and the z-axis), whereas the build platform may be coupled to a single-axis motion system (e.g., configured to move the build platform along the y-axis).

During operation, the additive fabrication device 100 may operate the extruder 102 (and/or build platform 120) by moving the extruder through desired positions relative to the build platform while extruding a photopolymer through a nozzle 104 of the extruder to form layers 110 of a part. This aspect of operation of the additive fabrication device 100 may be similar to the process of extrusion of a thermoplastic in a fused filament fabrication (FFF) or fused deposition modeling (FDM) device, although the extruded material and mechanism for producing extrusion of the material may be different for PE compared with FFF or FDM.

In particular, the extruder 102 may comprise one or more pumps for causing a liquid photopolymer to be extruded through the nozzle 104. In some embodiments, the extruder may include (or may be coupled to) a positive displacement pump configured to meter liquid from a reservoir of liquid into the nozzle. In some cases, the reservoir may be pressurized. The nozzle may comprise a post metering volume, being an interior volume arranged between the pump and the output orifice of the nozzle 104. During metering, the pump may be operated to pump liquid into the post metering volume. Some volume of liquid may then be extruded out of the nozzle through its output orifice due to the increased pressure of the liquid within the post metering volume caused by said pumping of liquid into the post metering volume. The fabrication device may be configured to operate the pump to control an amount of liquid extruded out of the nozzle. For example, the fabrication device may operate the pump such that sufficient liquid is extruded out of the nozzle to form a layer of solid material with a target thickness.

In the example of FIG. 1, a source of actinic radiation 115 may be arranged to direct light onto the nozzle 104 and/or to an area in proximity to the nozzle. Actinic radiation emitted by the source 115 may thereby be incident onto liquid photopolymer extruded from the nozzle 104, either as it is extruded or a short time afterwards. The source 115 may be configured to produce actinic radiation that has suitable properties (e.g., a wavelength, intensity, etc.) to effect photocuring of the liquid photopolymer to be extruded through the nozzle. The actinic radiation may change physical properties of the liquid photopolymer (e.g., by creating crosslinks between polymer chains). As a result, the source 115 may cure the extruded liquid to form solid material and thereby form layers 110. In some embodiments, the source of actinic radiation 115 may include one or more light emitting diodes (LEDs). In some embodiments, the source of actinic radiation 115 may be configured to emit ultraviolet light.

In some embodiments, the source of actinic radiation 115 and extruder 102 may be coupled to a common structure such that the source 115 and extruder 102 move together as a unit. For instance, the additive fabrication device 100 may comprise a gantry as part of a two-axis motion system and the source 115 and the extruder 102 may both be mounted to the gantry. In some embodiments, the additive fabrication device 100 may include multiple sources of actinic radiation 115 and some, but not all, of the sources may be coupled to the common structure. For example, a first source may be coupled to the common structure whereas a second source may be coupled to some other part of the device. In such a configuration, the first source may be constantly directed toward the nozzle, providing directed curing energy to material that has just been extruded from the nozzle, whereas the second source may more generally illuminate the area above the build platform to provide curing to at least some surfaces of the previously extruded material within the device.

Figure 2A:
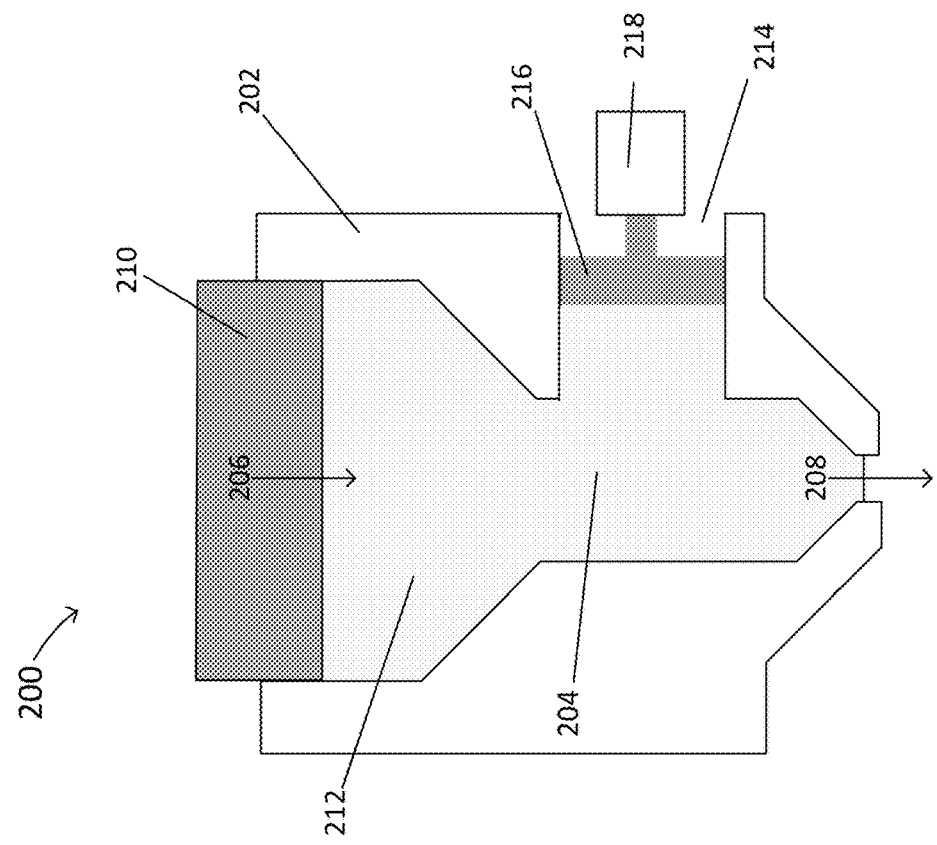
FIG. 2A depicts a cross-section of a material deposition mechanism, according to some embodiments.
Figure 2B:
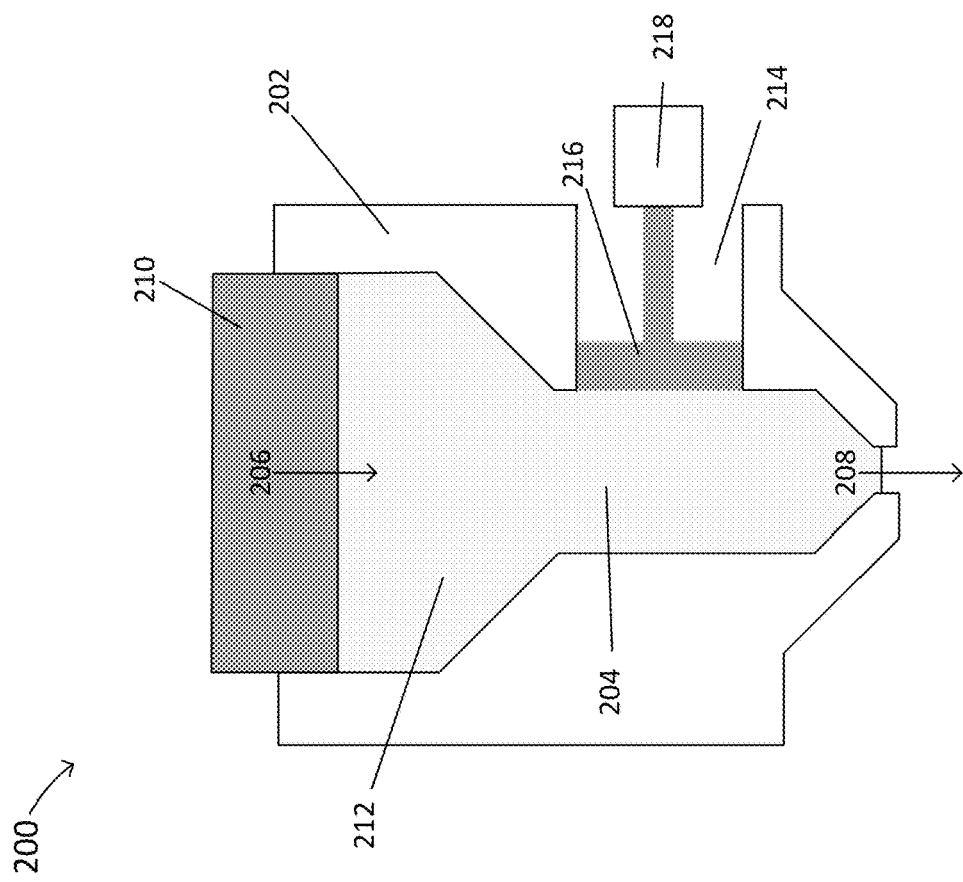
FIG. 2B depicts a cross-section of the material deposition mechanism of FIG. 2A in an alternative position, according to some embodiments.

FIGS. 2A-2B depict cross-sectional views of a material deposition mechanism 200, according to some embodiments. Material deposition mechanism 200 may be arranged within a suitable additive fabrication device (e.g., device 100 shown in FIG. 1), and operated to extrude or otherwise dispense a source material onto a build platform or previously formed layers of a part. In the subsequent discussion, operation of components of material deposition mechanism 200 may be performed in some embodiments by a suitable controller of the additive fabrication device to which the material deposition mechanism is coupled.

In the example of FIGS. 2A-2B, material deposition mechanism 200 includes a housing 202 that at least partially surrounds an interior space identified in the drawings as chamber 204. The chamber 204, whether a result of the housing 202 or otherwise, defines an inlet 206 and an orifice 208 which may allow material to pass through the chamber. As shown in the example of FIGS. 2A-2B, one configuration of the inlet 206 and the orifice 208 may be to arrange the inlet and orifice on opposites sides of the chamber 204, although the material deposition mechanism may also be arranged with other configurations in which the inlet and orifice have a different spatial relationship to one another than shown in this example.

In the example of FIGS. 2A-2B, a first actuator 210 may be configured to drive a source material 212 through the inlet 206 into the chamber 204 and out through the orifice 208. As such, the material deposition mechanism 200 may be configured to dispense the source material 212 to form a layer of a part (e.g., as described above in relation to FIG. 1). The source material 212 may comprise a polymer, ceramic, metal, combinations thereof, and/or any material that may be extruded through an orifice to form a three-dimensional part through additive fabrication techniques.

In accordance with some embodiments, the first actuator 210 may comprise a pump. For instance, in cases in which the source material 212 is a liquid during extrusion through the material deposition mechanism 200 (whether due to heating or otherwise), the first actuator may comprise a pump to push the liquid through the chamber 204. In some embodiments, the first actuator 210 may comprise a positive displacement pump, such as a rotary lobe pump, a progressive cavity pump, a rotary gear pump, a piston pump, a screw pump, a diaphragm pump, a gear pump, or combinations thereof. In some embodiments, the first actuator may comprise a syringe, which may be configured to be driven linearly with or without rotation.

During operation, the first actuator 210 may be operated to drive the source material 212 into the chamber 204 through the inlet 206. As a result, the pressure of the source material 212 within the chamber may build, causing source material to be extruded out of the orifice 208. As discussed above, however, it may be the case that when the first actuator 210 is operated to stop pumping (or to pump at a reduced rate), source material 212 within the chamber 204 may still be under pressure and as a result may produce unwanted emission of the source material out of the orifice. As further discussed above, however, by dynamically adjusting the post metering volume the pressure may be reduced and extrusion may more quickly cease. In the example of FIGS. 2A-2B, this effect is achieved via the channel 214, which is coupled to the chamber 204, and which includes a moveable element 216 that may be moved along the channel to adjust the size of the post metering volume. In the example of FIGS. 2A-2B, the post metering volume includes the chamber 204 and any portion of the channel 214 into which the source material 212 may flow, depending on the position of the moveable element 216.

According to some embodiments, the moveable element 216 may have a shape and size complementary to that of the perimeter of the channel 214 such that the moveable element 216 forms a seal with the channel 214. In some cases, the moveable element 216 may comprise a flexible material, such as rubber, to produce a liquid tight seal between the moveable element 216 and the channel 214. As such, the moveable element 216 may present a barrier that prevents the source material 212 from flowing past the moveable element 216 through the channel 214.

In some embodiments, the moveable element 216 may be coupled to another component that presents a barrier that prevents the source material 212 from flowing past the moveable element 216 through the channel 214. In some cases, this other component may also move along the channel 214. In some cases, the other component may be fixed in position but deform as a result of its coupling to the moveable element when the moveable element moves. For instance, the moveable element 216 may be attached to a flexible material, such as an elastomeric element or balloon, that is fixed at the channel periphery to produce a liquid tight seal. The moveable element may deform the flexible material toward and away from the chamber while the seal remains fixed in the channel and does not displace as a whole along the channel.

In the example of FIGS. 2A-2B, a second actuator 218 may be coupled to the moveable element 216 and configured to be operable to displace the moveable element 216 along the channel 214. In some embodiments, the second actuator 218 may comprise a pneumatic piston, electronic solenoid, DC motor, and/or any type of motor or pump that may push and retract the moveable element 216 along the channel. For example, the second actuator 218 may be configured to be operated to move the moveable element 216 back and forth between a first position and a second position as shown in FIG. 2A and FIG. 2B, although in some embodiments the second actuator may also be operated to move the moveable element 216 to various other positions as desired. As shown in FIGS. 2A-2B, the moveable element may be arranged at various positions within the channel 214, such as at the end of the channel such that the moveable element 216 forms part of a wall of the chamber 204 as shown in FIG. 2A, or deeper within the channel as shown in FIG. 2B.

Dynamic adjustment of the post metering volume of the material deposition mechanism 200 may be performed in the following manner. As shown in FIG. 2B, the second actuator has moved the moveable element 216 along the channel 214 a specified distance away from the chamber 204 to create an open space within the channel 214 into which the source material 212 may flow. Thus, the post metering volume (represented by the shaded space occupied by the source material 212) in FIG. 2B, which includes the interior volume of the chamber 204 plus the volume of the open space within the channel 214, is larger than the post metering volume in FIG. 2A, which includes only the interior volume of the chamber 204.

At a suitable moment when extrusion is to be stopped (e.g., when the first actuator 210 is operated to stop driving the source material into the chamber 203), the second actuator 218 may be operated to displace the moveable element 216 in the channel 214 away from the chamber 204 to increase the post metering volume. As a result, the volume that the source material 212 can occupy increases and the pressure of the source material 212 within the volume decreases, thereby preventing or reducing the extent to which the source material 212 undesirably is output from the orifice 208. Conversely, when extrusion is to be initiated (e.g., when the first actuator is operated to start driving the source material 212 into the chamber 204 again), the second actuator 210 may be operated to displace the moveable element 216 within the channel 214 toward the chamber 204 to decrease the post metering volume. This increases the pressure of the source material 212 to build up pressure to start dispensing source material 212 out of the orifice 208. Thus, by displacing the moveable element 216 as described above, the pressure of the source material 212 can be controlled to minimize or eliminate extrusion lag times during fabrication. Methods of operating the material deposition mechanism will be discussed further below with reference to FIG. 3.

The material deposition mechanism 200 may be operated in various types of additive fabrication devices, including FFF and PE devices, as discussed above. For instance, in an FFF device the first actuator may comprise an extruder that extrudes a thermoplastic filament into the chamber 204, which includes (or is) a hot end containing the orifice 208. Effectively adjusting the post metering volume of the hot end as described with the moveable element 216 in a channel may increase or decrease the pressure of molten plastic when the extruder starts or stops extruding the filament. Similarly, in a PE device, the first actuator may comprise a pump (e.g., a positive displacement pump) that pumps a photopolymer source material into a chamber toward an orifice. The moveable element 216 may move in the channel to effectively adjust the post metering volume to increase or decrease the pressure of the source material in the chamber.

In some embodiments, during operation as described above the second actuator 218 may displace the moveable element 216 a distance such that the resulting change in the post metering volume is greater than or equal to 2%, 5%, 8%, 10%, 12% or 15%. In some embodiments, during operation as described above the second actuator 218 may displace the moveable element 216 a distance such that the resulting change in the post metering volume is less than or equal to 20%, 15%, 12%, 10%, 8%, or 5%. Any suitable combinations of the above-referenced ranges are also possible (e.g., during operation as described above the second actuator 218 may displace the moveable element 216 a distance such that the resulting change in the post metering volume is greater than or equal to 5% and less than or equal to 10%).

In some embodiments, the distance between the first position and the second position of the moveable element 216 may be a distance of greater than or equal to 0.25 mm, 0.5 mm, 1 mm, 1.5 mm, 2 mm, or 3 mm. In some embodiments, the distance between the first position and the second position of the moveable element 216 may be a distance of less than or equal to 4 mm, 3 mm, 2.5 mm, 2 mm, or 1.5 mm. Any suitable combinations of the above-referenced ranges are also possible (e.g., the distance between the first position and the second position of the moveable element is greater than or equal to 0.5 mm and less than or equal to 2 mm).

In some embodiments, the moveable element 216 may, when operated, be displaced a distance that increases or decreases the post metering volume by adjusting the available space in the channel coupled to the chamber, such that the change in volume is greater than or equal to 5 µL, 10 µL, 50 µL, or 100 µL. In some embodiments, the moveable element may, when operated, be displaced a distance that increases or decreases the post metering volume by adjusting the available space in the channel coupled to the chamber, such that the change in volume of less than or equal to 600 µL, 500 µL, 400 µL, or 300 µL. Any suitable combinations of the above-referenced ranges are also possible (e.g., the moveable element 216 may, when operated, be displaced a distance that increases or decreases the post metering volume by adjusting the available space in the channel 214 coupled to the chamber, such that the change in volume is greater than or equal to 100 µL and less than or equal to 300 µL). In some embodiments, the post metering volume may increase from 1.5 mL to 1.55 mL or up to 1.8 mL as a result of the moveable element 216 being displaced from the first position to the second position. This change in volume may increase the pressure of the source material to prevent unwanted emission of the source material through the orifice. The distance the second actuator displaces the moveable element may depend on the size of the internal volume of the chamber and the compressibility of the source material used.

In some embodiments, the channel 214 may be arranged between the inlet and the orifice, as shown in FIGS. 2A-2B. In some embodiments, the channel 214 may be positioned proximate to the orifice 208 to increase or decrease the pressure of the source material near the orifice 208. In some embodiments, the channel may be positioned a distance of greater than or equal to 1 mm, 2 mm, 3 mm, or 5 mm from the orifice. In some embodiments, the channel may be positioned a distance of less than or equal to 15 mm, 10 mm, or 5 mm. from the orifice. Any suitable combinations of the above-referenced ranges are also possible (e.g., the channel may be positioned a distance from the orifice of greater than or equal to 2 mm and less than or equal to 10 mm). When the moveable object 216 moves away from the chamber, the source material near the orifice 208 may flow into the open space of the channel, reducing the pressure of the source material at the orifice to prevent the source material from flowing out of the orifice. This sequence of operations may prevent or mitigate unwanted emission of source material from the orifice, even in material deposition mechanisms that have large post metering volumes and/or that use highly compressible source materials, such as in PE fabrication. In at least some cases, the aforementioned proximity of the channel to the orifice may in part provide this benefit, or may increase the extent to which unwanted emission occurs.

It should be appreciated that the example of FIGS. 2A-2B is provided an as illustrative configuration and that a material deposition mechanism may be arranged with configurations for the inlet, orifice and channel other than the specific arrangement shown in the figures. For example, a material deposition mechanism may comprise an inlet and an orifice on the same or adjacent walls of the chamber, and/or a channel positioned opposite or adjacent to either the inlet or the orifice.

Figure 3:
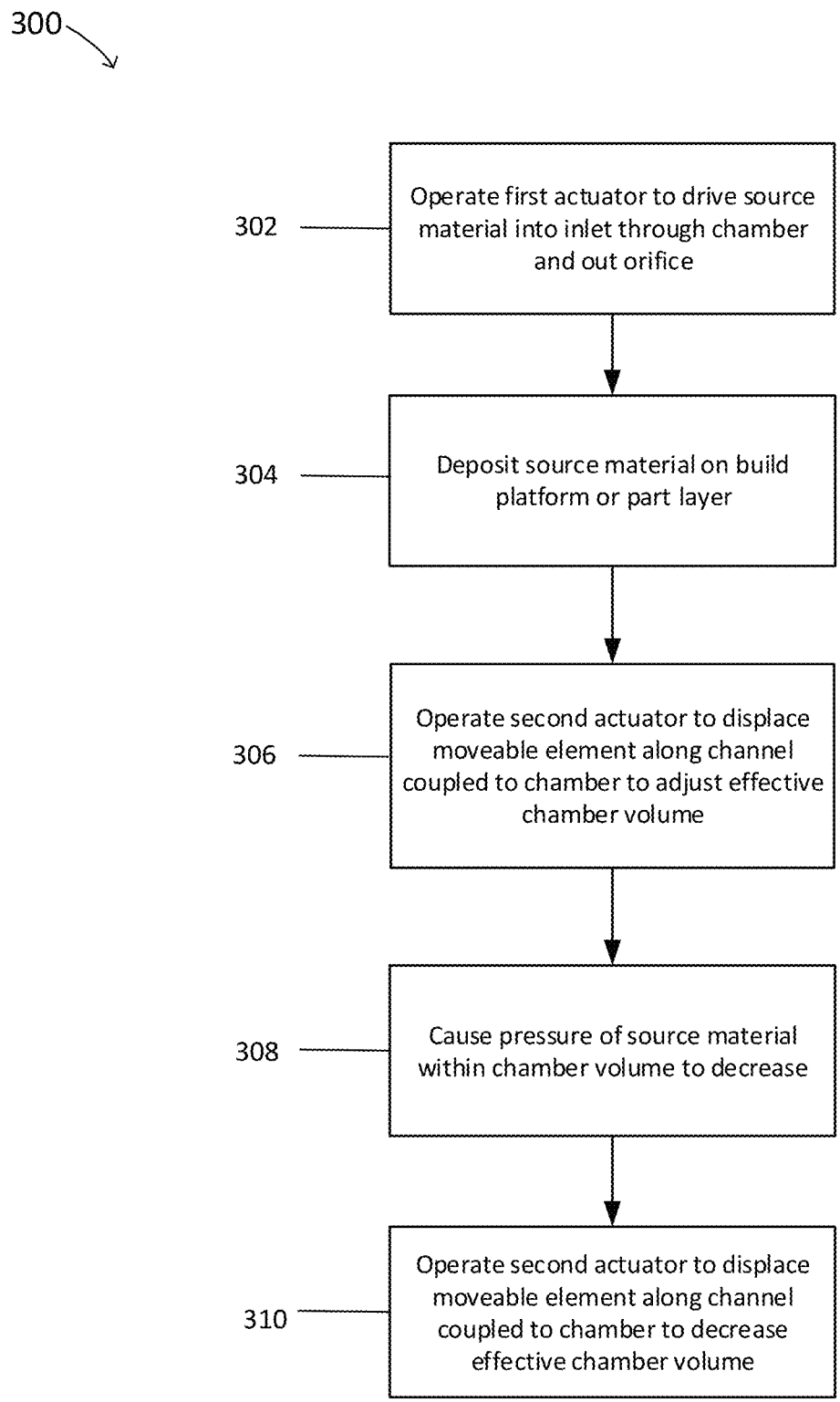
FIG. 3 is a flowchart of a method of operating a material deposition mechanism that includes a channel comprising a moveable element, according to some embodiments.

FIG. 3 is a flowchart of a method of operating a material deposition mechanism that includes a channel comprising a moveable element, according to some embodiments. Method 300 may for instance be performed by an additive fabrication device comprising material deposition mechanism 200 shown in FIGS. 2A-2B and described above, although may in general be performed by any suitable material deposition mechanism of an additive fabrication device that may be operated in the manner described.

Method 300 begins with act 302 in which a first actuator is operated to drive a source material into an inlet of a material deposition mechanism and through a chamber therein and out of an orifice of the material deposition mechanism. Act 302 may include operating a positive displacement pump at or near to the inlet to pump the source material into the chamber. As the first actuator drives the source material into the chamber, the pressure of the source material may increase, thereby causing the source material to flow out of the orifice.

In act 304 the source material is deposited by the material deposition mechanism onto a build platform or onto a previously formed layer of a part. Act 304 may comprise movement of the material deposition mechanism during extrusion of the source material to deposit the source material along a toolpath in accordance with a cross-section of an object to be fabricated. During act 304, the first actuator may continue operation so that the material deposition mechanism deposits the source material until the additive fabrication device operates the first actuator to stop extrusion. When the first actuator stops driving the source material into the chamber, as discussed above, the source material may still be under pressure within the chamber which may cause unwanted emission of the source material through the orifice.

In act 306, a second actuator is operated to displace a moveable element along a channel coupled to the chamber to adjust the post metering volume. In some embodiments the second actuator may move the moveable element from a first position to a second position. When the second actuator retracts the moveable element away from the chamber to the second position, the source material may flow into an open space in the channel formed by the displaced moveable element, increasing the post metering volume. In some embodiments, the second actuator may displace the moveable element at the same time the first actuator stops pumping. In some embodiments, the second actuator may retract the moveable element before or after the first actuator stops pumping. Different timing events may be used for different systems having various chamber volumes, material compressibility, and material deposition sequences and patterns.

By increasing the post metering volume, in act 308, the pressure of the source material within the chamber volume may decrease. Decreasing the pressure of the source material within the chamber (assuming the pressure is lower than the exterior pressure) may prevent or mitigate the unwanted emission of source material in the post metering volume out of the orifice.

Subsequent to act 308, the first actuator may be operated to start driving source material back into the chamber to continue dispensing source material onto the build platform. This may cause an increase in the pressure of the source material in the chamber, thereby pushing the source material through the orifice. The second actuator may be operated, in act 310, to return the moveable element back to the first position, decreasing the post metering volume while pushing the source material in the channel back into the chamber. This may increase the pressure of the source material within the chamber, thereby aiding in restarting the flow of source material out of the orifice. In some embodiments, motion of the second actuator back to the first position may be timed relative to restarting the first actuator to drive the source material through the chamber. For example, the second actuator may be moved back to the first position at the before, at the same time, or some time after the first actuator starts operation again.

Figure 4A:
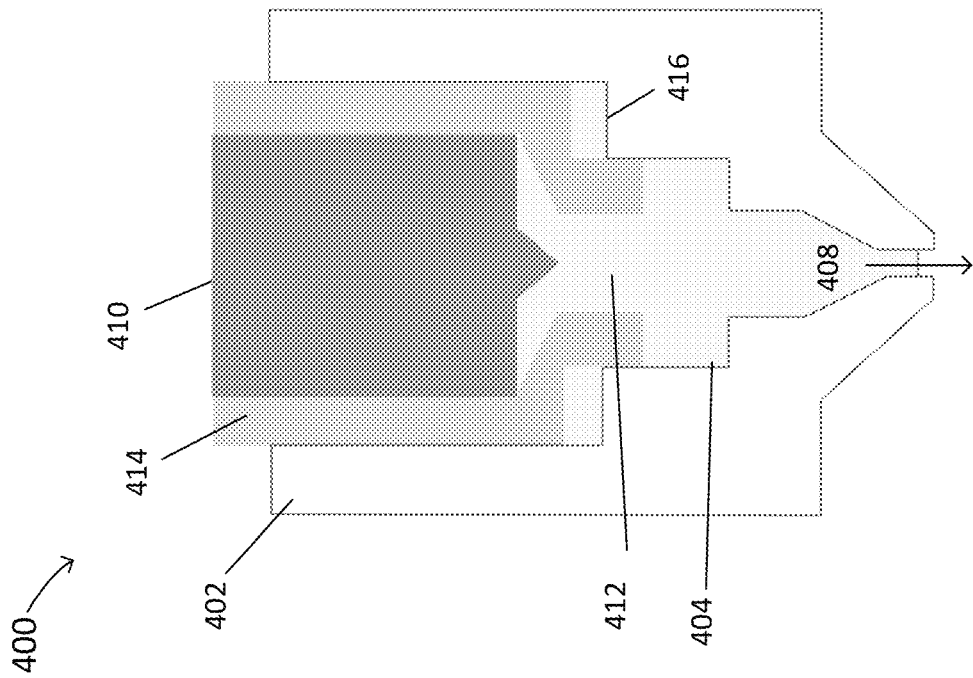
FIG. 4A depicts a cross-section of a material deposition mechanism, according to some embodiments.
Figure 4B:
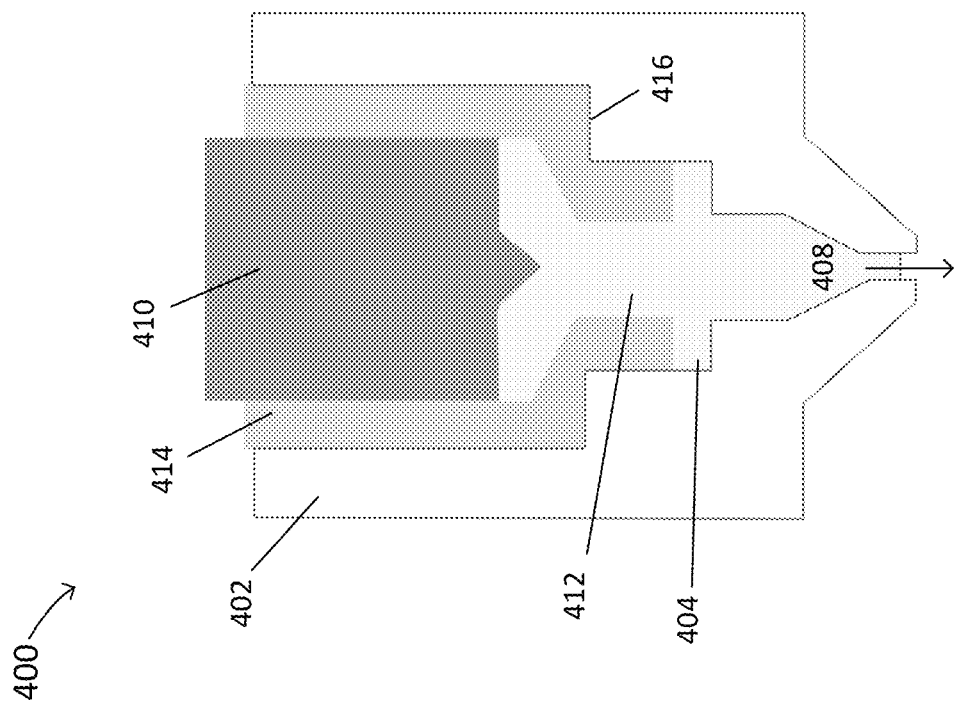
FIG. 4B depicts a cross-section of the material deposition mechanism of FIG. 4A in an alternative position, according to some embodiments.

FIGS. 4A-4B depict cross-sectional views of a material deposition mechanism 400, according to some embodiments. Material deposition mechanism 400 may be arranged within a suitable additive fabrication device (e.g., device 100 shown in FIG. 1), and operated to extrude or otherwise dispense a source material onto a build platform or previously formed layers of a part. In the subsequent discussion, operation of components of material deposition mechanism 400 may be performed in some embodiments by a suitable controller of the additive fabrication device to which the material deposition mechanism is coupled.

In the example of FIGS. 4A-4B, material deposition mechanism 400 includes a housing 402 that at least partially surrounds an interior space identified in the drawings as chamber 404. The chamber 404, whether a result of the housing 402 or otherwise, defines an orifice 408 which may allow material to pass out of the chamber. In the example of FIGS. 4A-4B, a pump actuator 410 may be configured to drive a source material 412 into the chamber 404 and out through the orifice 408. The source material may reach an input of the pump actuator 410 via any suitable technique; for instance, a reservoir of the source material may be coupled to an input of the pump actuator either directly or via other structures such as one or more tubes.

During operation, the material deposition mechanism 400 may be configured to operate the pump actuator 410 to dispense the source material 412 to form a layer of a part (e.g., as described above in relation to FIG. 1). The source material 412 may comprise a polymer, ceramic, metal, combinations thereof, and/or any material that may be extruded through an orifice to form a three-dimensional part through additive fabrication techniques. As shown in the example of FIGS. 4A-4B, one configuration of the pump actuator 410 and the orifice 408 may be to arrange the pump actuator and orifice on opposites sides of the chamber 404, although the material deposition mechanism may also be arranged with other configurations in which the pump actuator and orifice have a different spatial relationship to one another than shown in this example.

In accordance with some embodiments, the pump actuator 410 may comprise a pump. For instance, in cases in which the source material 412 is a liquid during extrusion through the material deposition mechanism 400 (whether due to heating or otherwise), the pump actuator may comprise a pump to push the liquid through the chamber 404. In some embodiments, the pump actuator 410 may comprise a positive pressure pump. In some embodiments, the pump actuator 410 may comprise a positive displacement pump, such as a progressive cavity pump, a rotary lobe pump, a rotary gear pump, a screw pump, a vane pump, a cam pump, a piston pump, a diaphragm pump, a plunger, a rotor, or combinations thereof. In some embodiments, the pump actuator may comprise a syringe, which may be configured to be driven linearly with or without rotation.

During operation, the pump actuator 410 may be operated to drive the source material 412 into the chamber 404. As a result, the pressure of the source material 412 within the chamber may build, causing source material to be extruded out of the orifice 408. As discussed above, however, it may be the case that when the pump actuator 410 is operated to stop pumping (or to pump at a reduced rate), source material 412 within the chamber 404 may still be under pressure and as a result may produce unwanted source material out of the orifice. As further discussed above, however, by dynamically adjusting the post metering volume the pressure may be reduced and extrusion may more quickly cease. In the example of FIGS. 4A-4B, this effect is achieved via a stator 414, which is arranged at least partially within the chamber 404, and which is free to move within the chamber to adjust the size of the post metering volume. That is, the extent to which the stator is present within the chamber adjusts the amount of available space within the chamber that may be filled with the source material. When the stator moves, it may increase or decrease this available space, thereby adjusting the post metering volume. In the example of FIGS. 4A-4B, the post metering volume includes the chamber 404 which may increase or decrease, depending on the position of the stator 414.

In a conventional positive displacement pump the stator may be constrained from movement, however in the example of FIGS. 4A-4B the stator 414 may be free to move, at least to some extent. In some embodiments, the stator 414 may be moved as a result of frictional forces between the pump actuator 410 and the stator 414. For example, in cases in which the pump actuator includes a screw pump, rotation of the screw pump may apply a force to the stator causing it to move. This motion may for instance be linear within the housing 402, and may or may not include rotational movement of the stator 414. The movement of the stator 414 may also follow the direction of operation of the pump actuator. For example, when the pump actuator is operated to push source material into the chamber 404, the stator may be pushed toward the chamber 404. Conversely, when the pump actuator is operated in the reverse direction, the stator may be pushed away from the chamber. As a result, operation of the pump actuator may cause motion of the stator. It may be noted that such a configuration may in at least some cases require that the frictional force between the pump actuator and the stator is higher than any frictional forces between the stator and the chamber walls or other structure with which it is in contact.

In the example of FIGS. 4A-4B, the stator 414 may be arranged at least partially within the chamber 404. In some embodiments, the stator 414 may be constrained within the housing 402 (and/or within other structures) such that the stator 414 may move a specified linear distance. As in the example of FIGS. 4A-4B, the stator 414 may move in and out of the chamber such that the post metering volume in FIG. 4B (where the stator has moved out of the chamber) is larger than the post metering volume in FIG. 4A. In some embodiments, the stator 414 may linearly displace by rotating while camming upwards or downwards. For example, the stator 414 may be constrained by the housing by a thread or some element to convert rotational movement to linear displacement.

The motion of the stator 414 may be caused by actuation of the pump actuator 410. In the example of FIGS. 4A-4B, the pump actuator 410 may be arranged at least partially within the stator 414. As discussed above, the pump actuator may engage the stator 414 and cause the stator 414 to move within the chamber 404 due to higher frictional forces between the pump actuator and the stator compared with frictional forces between the stator and the chamber walls. For example, when the pump actuator actuates in one direction (e.g., by rotating), the high frictional forces between the actuator and the pump may result in the stator rotating with the actuator and camming upwards or downwards (e.g., linearly displacing into or out of the chamber).

In some embodiments, the stator may move until its motion is blocked by one or more mechanical stops which may constrain the linear and/or rotational motion of the stator. The mechanical stops may in some embodiments include part of the housing, such as ledge 416 shown in FIGS. 4A-4B. Other mechanical stops may be located outside of the chamber (not shown in FIGS. 4A-4B). As one example of motion of the stator, the stator may rotate a fraction of a full rotation of motion between a first position (e.g., as far as it can move into the chamber) and a second position (e.g., as far as it can move out of the chamber). The stator may rotate during this process before hitting a mechanical stop, which limits the stator's linear displacement. For example, when the pump actuator actuates in a first direction to initiate extraction, the actuator may engage the stator and cause it to displace into the chamber until the stator hits a mechanical stop, restraining the stator while the pump actuator continues to actuate. At such a point the actuator may begin moving relative to the stator, creating the positive displacement flow rate to dispense the source material through the orifice until it is desired to stop extraction. To stop extraction, the additive fabrication device may operate the pump actuator to reverse direction and actuate in a second direction. Due to the frictional forces between the actuator and the pump, the actuator may engage the stator and cause it to displace out of the chamber until the stator hits a mechanical stop. Thus, the stator may be restrained within the housing between a first and second position by mechanical stops.

As a result of the motion of the stator 414 described above, dynamic adjustment of the post metering volume of the material deposition mechanism 400 may be performed in the following manner. Initially the pump actuator 410 may be operated to drive the source material 412 through the chamber 404 as described above. The operation of the pump actuator in this manner may cause the stator 414 to be positioned at a lower position as shown in FIG. 4A. Subsequently, at a suitable moment when extrusion is to be stopped (e.g., when the pump actuator 410 is operated to stop driving the source material 412 into the chamber 404), the pump actuator 410 may be operated to reverse direction, which causes the stator 414 to move out of the chamber 404 to increase the post metering volume. As a result, the volume that the source material can occupy increases and the pressure of the source material 412 within the volume decreases, thereby preventing or reducing the extent to which the source material 412 undesirably is output from the orifice 408.

As shown in FIG. 4B, operation of the pump actuator in this manner has caused the stator 414 to move out of the chamber 404 to create a larger volume within the chamber into which the source material 412 may flow. Thus, the post metering volume (represented by the shaded space occupied by the source material 412) in FIG. 4B is larger than the post metering volume in FIG. 4A, in which the stator 414 is positioned in the chamber closer to the orifice 408.

Figure 5:
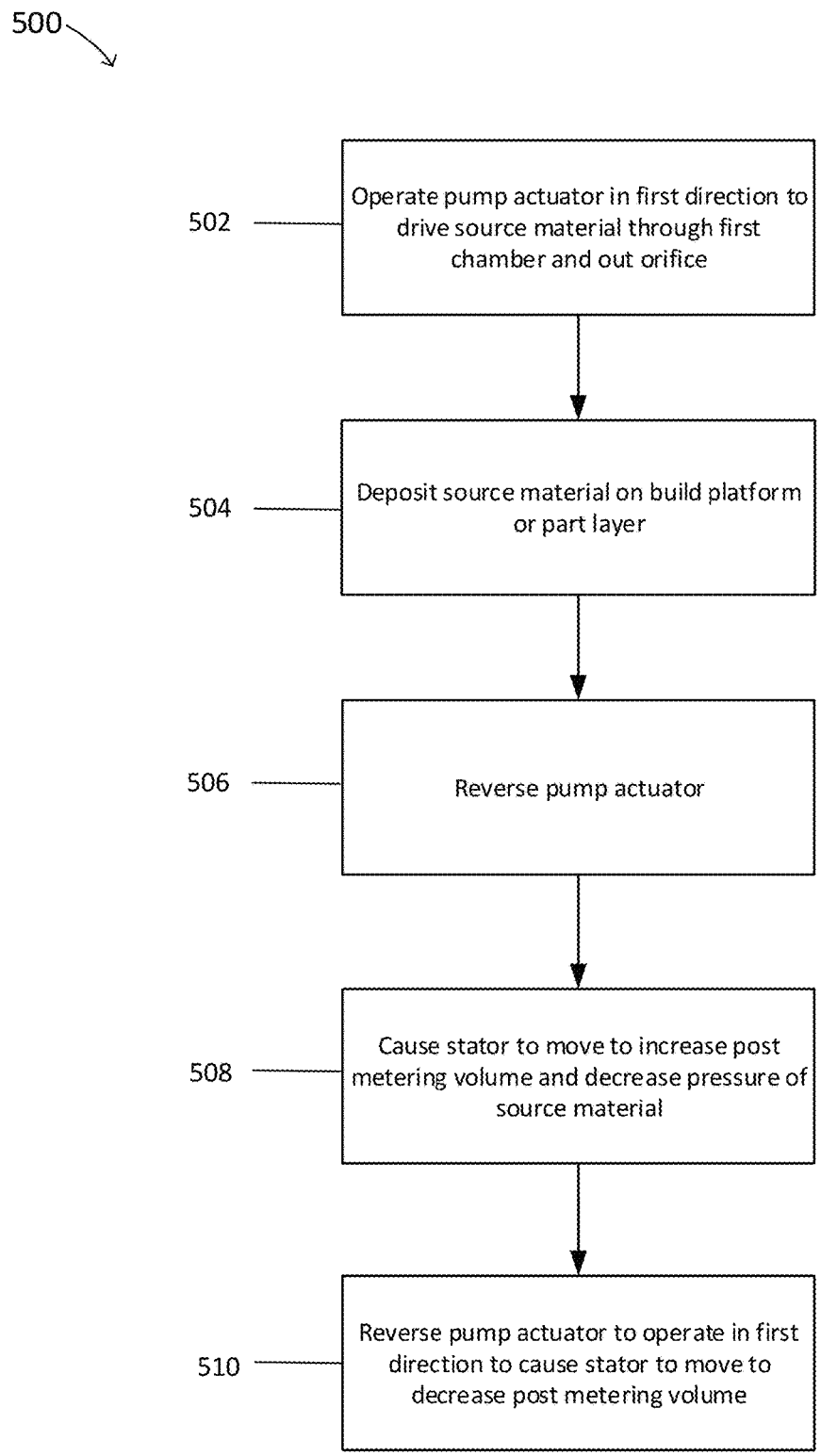
FIG. 5 is a flowchart of a method of operating a material deposition mechanism that includes a moveable stator, according to some embodiments.

When extrusion is to be initiated (e.g., when the pump actuator is operated to start driving the source material 412 into the chamber 404 again), the pump actuator may be operated (e.g., by reversing direction again) to displace the stator 414 into the chamber 404 to decrease the post metering volume. This increases the pressure of the source material 412 to build up pressure to start dispensing source material 414 out of the orifice 408. Thus, by displacing the stator as described above, the pressure of the source material 412 can be controlled to minimize or eliminate extrusion lag times during fabrication. Methods of operating the material deposition mechanism 400 will be discussed further below with reference to FIG. 5.

The material deposition mechanism 400 may be operated in various types of additive fabrication devices, including FFF and PE devices, as discussed above. For instance, an additive fabrication device may comprise an extruder that extrudes thermoplastic into the chamber, which includes a hot end containing the orifice 408. Effectively adjusting the post metering volume of the hot end as described with the moveable stator in the chamber may increase or decrease the pressure of molten plastic when the extruder starts or stops extruding the filament. Similarly, in a PE device, the pump actuator may comprise a pump (e.g., a positive displacement pump) that pumps a photopolymer source material into a chamber toward an orifice. The moveable stator may move in the chamber to effectively adjust the post metering volume to increase or decrease the pressure of the source material in the chamber.

In some embodiments, during operation as described above the pump actuator 410 may displace the stator 414 a distance such that the resulting change in the post metering volume is greater than or equal to 2%, 5%, 8%, 10%, 12% or 15%. In some embodiments, during operation as described above the pump actuator 410 may displace the stator 414 a distance such that the resulting change in the post metering volume is less than or equal to 20%, 15%, 12%, 10%, 8%, or 5%. Any suitable combinations of the above-referenced ranges are also possible (e.g., a change in the post metering volume produced by the stator moving between the first and second positions changes the post metering volume by an amount that is greater than or equal to 5% and less than or equal to 10%).

In some embodiments, the distance between the first position and the second position of the moveable stator may be a linear distance of greater than or equal to 0.25 mm, 0.5 mm, 1 mm, 1.5 mm, 2 mm, or 3 mm. In some embodiments, the distance between the first position and the second position of the moveable stator may be a linear distance of less than or equal to 4 mm, 3 mm, 2.5 mm, 2 mm, or 1.5 mm. Any suitable combinations of the above-referenced ranges are also possible (e.g., the distance between the first position and the second position of the moveable stator is greater than or equal to 0.5 mm and less than or equal to 2 mm).

In some embodiments, the stator may displace a distance that increases the volume of the chamber by an amount greater than or equal to 5 μL, 10 μL, or 50 μL, or 100 μL. In some embodiments, the stator may displace a distance that increases the volume of the chamber by an amount less than or equal to 600 μL, 500 μL, 400 μL, or 300 μL. Any suitable combinations of the above-referenced ranges are also possible (e.g., the stator may displace a distance that increases the volume of the chamber by an amount greater than or equal to 10 μL and less than or equal to 500 μL. In some embodiments, for example, the post metering volume may increase from 2000 μL to 2100 μL or up to 2300 μL as a result of the stator being displaced from the first position to the second position. This change in volume may increase the pressure of the source material to prevent unwanted emission of the source material through the orifice. The distance the pump actuator displaces the moveable stator may depend on the size of the internal volume of the chamber and the compressibility of the source material used.

When the stator displaces out of the chamber, the source material near the orifice 408 may flow into the larger post metering volume, reducing the pressure of the source material at the orifice to prevent the source material from flowing out of the orifice. This configuration may prevent or mitigate unwanted emission of the source material even in material deposition mechanisms that have large post metering volumes and/or that use highly compressible source materials, such as in PE fabrication, because the change in volume and pressure occurs proximate to the orifice.

FIG. 5 is a flowchart of a method of operating a material deposition mechanism that includes a moveable stator, according to some embodiments. Method 500 may for instance be performed by an additive fabrication device comprising material deposition mechanism 400 shown in FIGS. 4A-4B and described above, although may in general be performed by any suitable material deposition mechanism of an additive fabrication device that may be operated in the manner described.

Method 500 begins with act 502 in which a pump actuator is operated in a first direction to drive a source material through a chamber of a material deposition mechanism and out of an orifice of the material deposition mechanism. Act 502 may include operating a positive displacement pump to pump the source material into the chamber. As the pump actuator drives the source material into the chamber, the pressure of the source material may increase, thereby causing the source material to flow out of the orifice. As described above, a stator within the material deposition mechanism may be caused to move into the chamber to some degree when the pump actuator begins to be operated to drive the source material through the chamber.

In act 504 the source material is deposited by the material deposition mechanism onto a build platform or onto a previously formed layer of a part. Act 504 may comprise movement of the material deposition mechanism during extrusion of the source material to deposit the source material along a toolpath in accordance with a cross-section of an object to be fabricated. During act 504, the pump actuator may continue operation so that the material deposition mechanism deposits the source material until the additive fabrication device operates the pump actuator to stop extrusion. When the pump actuator stops driving the source material into the chamber, as discussed above, the source material may still be under pressure within the chamber which may cause unwanted emission of the source material through the orifice.

In act 506, the additive fabrication device operates the pump actuator to pump in a second direction. The second direction may be an opposite direction from the first direction such that the pump actuator reverses direction. In act 508, reversal of the pump actuator causes a stator arranged at least partially in the chamber to move out of the chamber to adjust the post metering volume. As discussed above, motion of the actuator may cause the stator to move due to frictional forces between the actuator and the stator. In some embodiments the second actuator may move the moveable element from a first position to a second position. When the pump actuator retracts the moveable stator out of the chamber to the second position, the source material may flow into a larger volume in the chamber formed by the displaced moveable stator, increasing the post metering volume.

By increasing the post metering volume, in act 508, the pressure of the source material within the chamber volume may decrease. Decreasing the pressure of the source material within the chamber (assuming the pressure is lower than the exterior pressure) may prevent or mitigate unwanted emission of the source material out of the orifice.

In act 510, the pump actuator may be optionally reversed to start operating in the first direction again, thereby returning the stator to the first position and decreasing the post metering volume. Starting operation of the pump actuator in the first direction in this manner may, due to motion of the stator, also cause compression of the source material into a smaller volume when starting to drive additional source material into the chamber. In some embodiments, said compression may increase the pressure of the source material within the chamber to quickly restart flow of material out of the orifice.

It may be appreciated that while the above discussion describes pressure changes within a volume (e.g., the chamber 204 shown in FIGS. 2A-2B or the chamber 404 shown in FIGS. 4A-4B), the above-described techniques for causing pressure changes of the source material in the post metering volume will generally not cause instantaneous pressure changes throughout the entire volume. Thus, while pressure changes may be discussed above in a manner consistent with those pressure changes being instantaneous, it will be appreciate that such a description is provided for purposes of clarity and it is not assumed that in practice the pressure changes will instantaneously propagate through the volume in question. For example, the pressure change may initiate from where the new volume is created into which the source material may flow and propagate outward from the new volume. In such a situation, arranging the position where additional volume is created (i.e., where the pressure change initiates) proximate to the orifice may have the benefit of producing faster pressure changes of the source material at the orifice compared with positions further from the orifice. For example, in at least some embodiments discussed with reference to FIGS. 2A-2B, the time taken for the pressure of the source material at the orifice to change when the moveable element is moved may be a function of the distance from the channel 214 to the orifice 208.

FIG. 6 is a block diagram of a system suitable for practicing aspects of the invention, according to some embodiments. System 600 illustrates a system suitable for generating instructions to perform additive fabrication by an additive fabrication device and subsequent operation of the additive fabrication device to fabricate a part. For instance, instructions to fabricate a part while operating one or more actuators to adjust a post metering volume as described by the various techniques above may be generated by the system and provided to the additive fabrication device. For example, instructions to fabricate a part while operating the first and second actuators in the material deposition mechanism 200 shown in FIGS. 2A-2B may be generated by the system and provided to the additive fabrication device, or instructions to fabricate a part while operating the pump actuator in the material deposition mechanism 400 shown in FIGS. 4A-4B may be generated by the system and provided to the additive fabrication device. Various parameters associated with operating actuators to adjust the post metering volume may be stored by computer system 610 and accessed when generating instructions for the additive fabrication device 620.

It will be appreciated that any of the above-described techniques for adjusting the post metering volume may be combined in any suitable manner and in any suitable order. According to some embodiments, computer system 610 may execute software that generates instructions for fabricating a part using an additive fabrication device, such that when said instructions are executed by the additive fabrication device the additive fabrication device performs a process of fabricating the part such as the process 300 shown in FIG. 3 or process 600 shown in FIG. 5. Said instructions may be provided to an additive fabrication device, such as additive fabrication device 620, via link 612, which may comprise any suitable wired and/or wireless communications connection. In some embodiments, a single housing holds the computing device 610 and additive fabrication device 620 such that the link 612 is an internal link connecting two modules within the housing of system 600.

Figure 6:
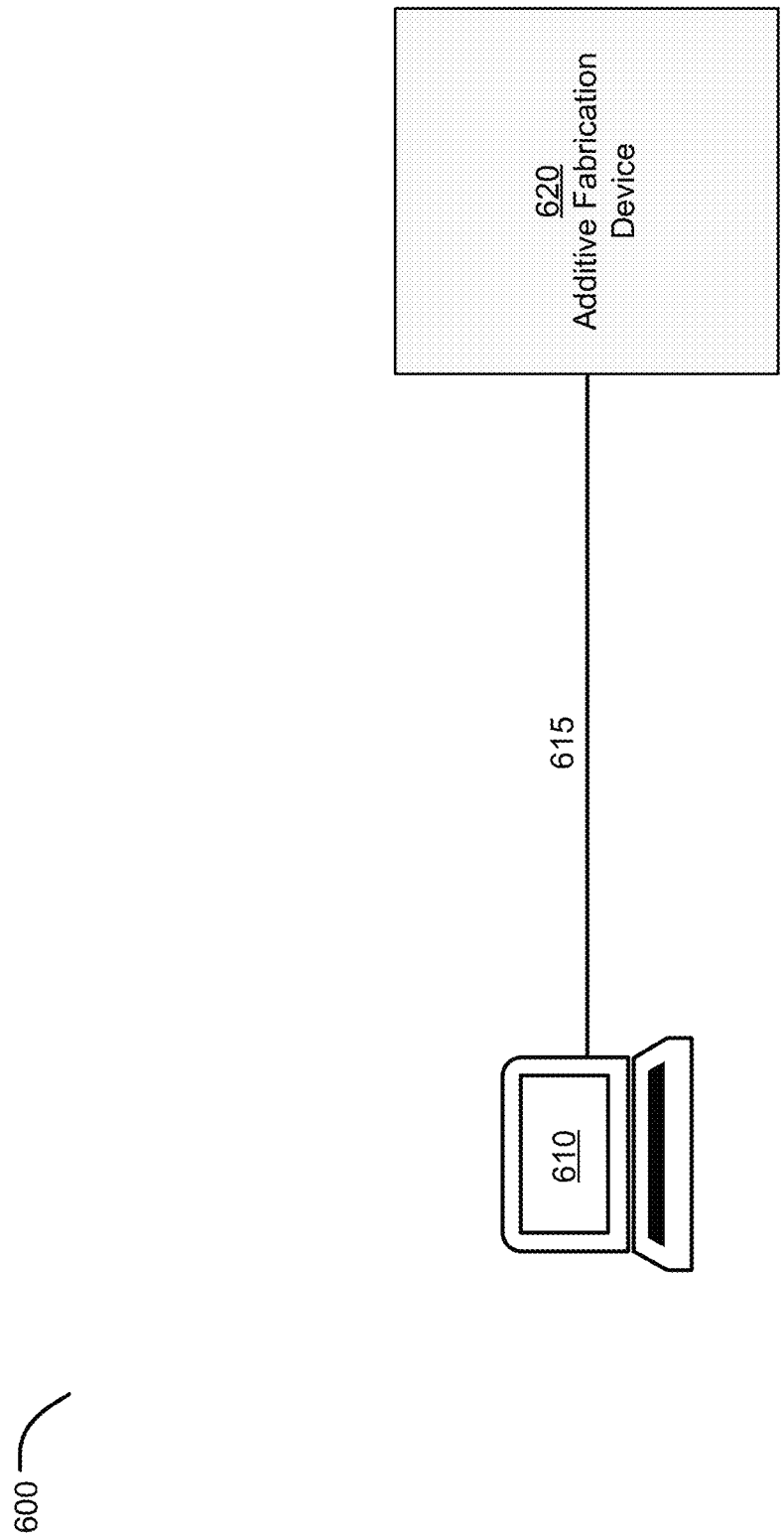
FIG. 6 is a block diagram of a system suitable for practicing aspects of the invention, according to some embodiments.
Figure 7:
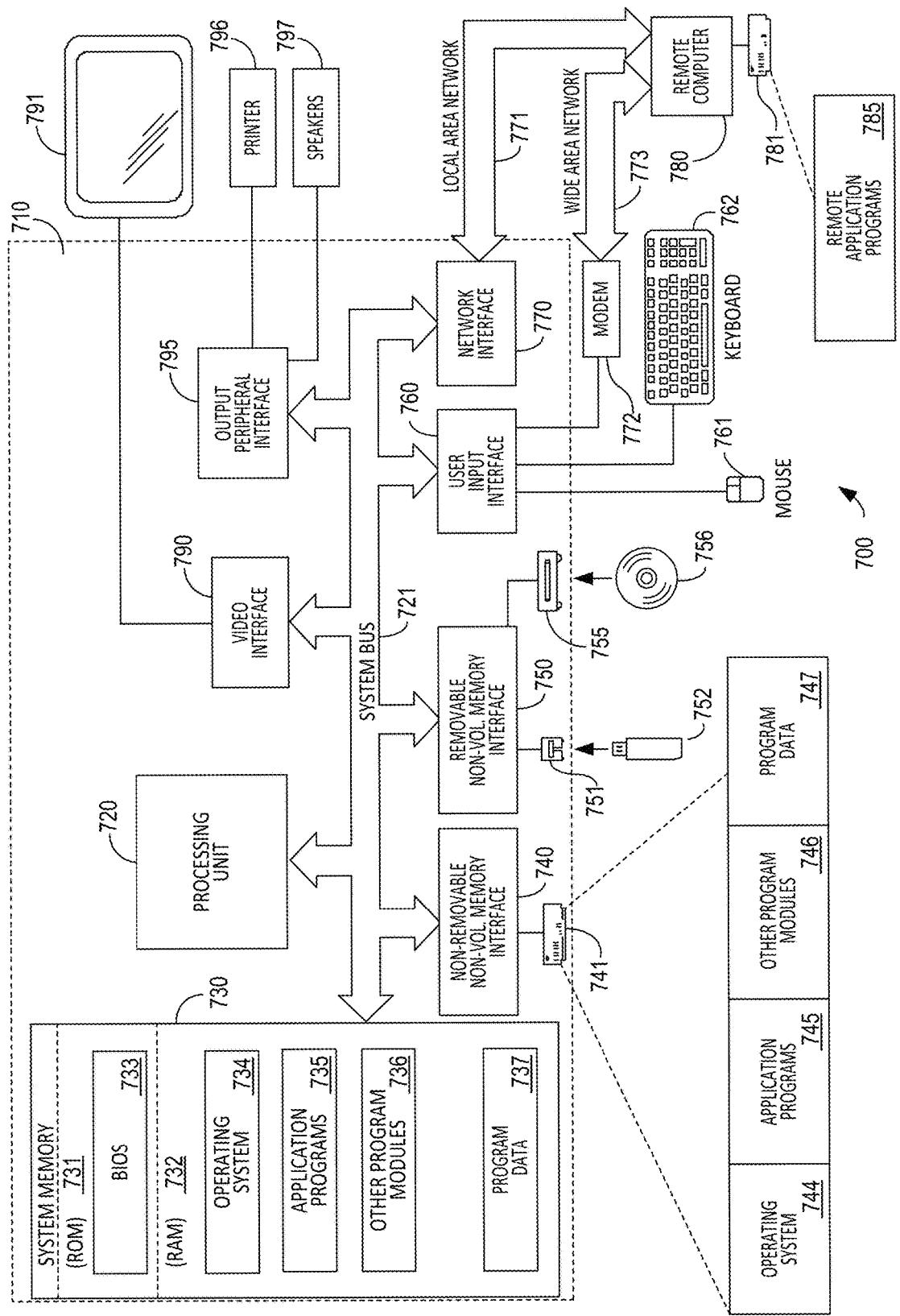
FIG. 7 illustrates an example of a computing system environment on which aspects of the invention may be implemented.

FIG. 7 illustrates an example of a suitable computing system environment 700 on which the technology described herein may be implemented. For example, computing environment 700 may form some or all of the computer system 610 shown in FIG. 6. The computing system environment 700 is only one example of a suitable computing environment and is not intended to suggest any limitation as to the scope of use or functionality of the technology described herein. Neither should the computing environment 700 be interpreted as having any dependency or requirement relating to any one or combination of components illustrated in the exemplary operating environment 700.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the technology described herein includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a flash drive 751 that reads from or writes to a removable, nonvolatile memory 752 such as flash memory, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Having thus described several aspects of at least one embodiment of this invention, it is to be appreciated that various alterations, modifications, and improvements will readily occur to those skilled in the art.

While the description has discussed various techniques that allow an additive fabrication device to dynamically adjust the size of a post metering volume for adjusting pressure of source material in the volume, it may be appreciated that the various techniques disclosed herein may also be applied in other devices in which liquid is pumped into a nozzle, such as in adhesive dispensing devices.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An additive fabrication device configured to form parts from a source material on a build platform, the additive fabrication device comprising:
   a build platform;
   a motion system configured to move along at least one axis; and
   a material deposition mechanism coupled to the motion system and configured to deposit a source material onto the build platform, the material deposition mechanism comprising:

a chamber comprising an orifice;

a stator arranged at least partially within the chamber and free to move between first and second positions within the chamber; and a pump actuator arranged at least partially within the stator and configured, when operated, to:

drive the source material in a first direction through the stator, and through the chamber and out of the orifice, and drive motion of the stator within the chamber in the first direction.

2. The additive fabrication device of claim 1, wherein the pump actuator comprises a positive displacement pump.

3. The additive fabrication device of claim 1, wherein the pump actuator comprises a rotor.

4. The additive fabrication device of claim 1, wherein the pump actuator comprises a screw pump.

5. The additive fabrication device of claim 1, wherein the pump actuator comprises a syringe.

6. The additive fabrication device of claim 1, wherein actuation of the pump actuator causes the stator to move between the first and second positions.

7. The additive fabrication device of claim 1, wherein when the pump actuator actuates in the first direction, the stator is configured to move from the first position to the second position.

8. The additive fabrication device of claim 7, wherein when the pump actuator actuates in a second direction, the stator is configured to move from the second position to the first position.

9. The additive fabrication device of claim 1, wherein the material deposition mechanism further comprises a housing in which the stator is moveably held within the first and second positions.

10. The additive fabrication device of claim 9, wherein the housing comprises mechanical stops to prevent the stator from moving beyond the first and second positions.

11. The additive fabrication device of claim 1, wherein the stator moves linearly between the first and second positions.

12. The additive fabrication device of claim 7, wherein the pump actuator moving in the first direction causes the stator to move toward the orifice.

13. The additive fabrication device of claim 1, wherein the source material is in contact with at least a portion of the pump actuator.

* * * * *